US010198482B2

(12) United States Patent
Tseng

(10) Patent No.: US 10,198,482 B2
(45) Date of Patent: *Feb. 5, 2019

(54) RANKING OF ADDRESS BOOK CONTACTS BASED ON SOCIAL PROXIMITY

(71) Applicant: Facebook, Inc., Menlo Park, CA (US)

(72) Inventor: Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/189,837

(22) Filed: Jun. 22, 2016

(65) Prior Publication Data

US 2016/0299900 A1 Oct. 13, 2016

Related U.S. Application Data

(63) Continuation of application No. 14/503,884, filed on Oct. 1, 2014, now Pat. No. 9,396,288, which is a continuation of application No. 12/972,279, filed on Dec. 17, 2010, now Pat. No. 8,880,555.

(51) Int. Cl.
*G06F 17/30* (2006.01)
*G06Q 30/02* (2012.01)
*H04L 29/06* (2006.01)
*H04L 29/12* (2006.01)

(52) U.S. Cl.
CPC ......... *G06F 17/3053* (2013.01); *G06F 17/30* (2013.01); *G06F 17/30575* (2013.01); *G06F 17/30867* (2013.01); *G06F 17/30958* (2013.01); *G06F 17/30988* (2013.01); *G06Q 30/02* (2013.01); *H04L 61/1594* (2013.01); *H04L 67/42* (2013.01)

(58) Field of Classification Search
CPC ................. G06F 17/30; G06F 17/3053; G06F 17/30575; G06F 17/30867
USPC ................................................... 707/600–899
See application file for complete search history.

(56) References Cited

U.S. PATENT DOCUMENTS

| | | | | |
|---|---|---|---|---|
| 2010/0217720 A1* | 8/2010 | Jones | ...................... | G06Q 50/01 705/319 |
| 2011/0208814 A1* | 8/2011 | Bostrom | ................ | G06Q 10/10 709/204 |
| 2011/0231396 A1* | 9/2011 | Dhara | ................. | H04L 12/1818 707/731 |
| 2011/0231407 A1* | 9/2011 | Gupta | .................... | G06Q 10/10 707/748 |

* cited by examiner

*Primary Examiner* — Isaac M Woo
(74) *Attorney, Agent, or Firm* — Baker Botts L.L.P.

(57) ABSTRACT

In one embodiment, a user of a social networking system requests to look up an address book maintained by the social networking system. The social networking system improves the look up search results by ranking one or more contacts in the address book based on social graph, social relationship and communication history information.

19 Claims, 6 Drawing Sheets

RANKING OF ADDRESS BOOK CONTACTS BASED ON SOCIAL PROXIMITY

PRIORITY

This application is a continuation under 35 U.S.C. § 120 of U.S. patent application Ser. No. 14/503,884, filed 1 Oct. 2014, which is a continuation under 35 U.S.C. § 120 of U.S. patent application Ser. No. 12/972,279, filed 17 Dec. 2010, now U.S. Pat. No. 8,880,555 B2, issued on 4 Nov. 2014, which are incorporated herein by reference.

TECHNICAL FIELD

The present disclosure relates generally to a social network service and, more particularly, to ranking a user's address book contacts based on social graph information and observed interaction between the user and the address book contacts.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system. For example, a user of a social networking website can access an address book stored in the social networking website, look up a contact in the address book and connect with the contact through email.

SUMMARY

Particular embodiments relate to adjusting the displayed location or order of contacts in an address book based on social graph and communication history information. These and other features, aspects, and advantages of the disclosure are described in more detail below in the detailed description and in conjunction with the following figures.

DETAILED DESCRIPTION

Figure 1:
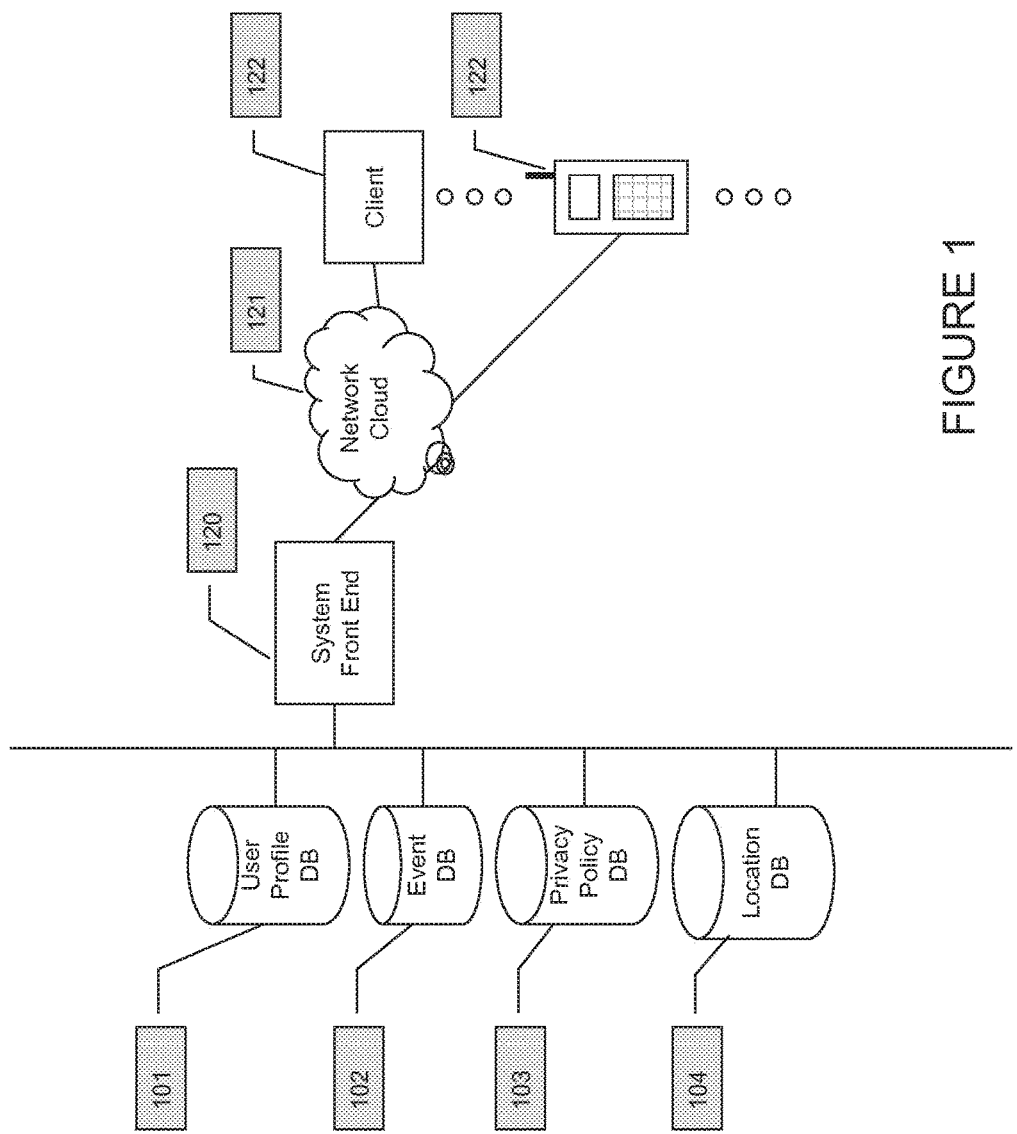
FIG. 1 illustrates an example social networking system.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts.

A social network system may maintain social graph information, which can be generally defined by the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user. The privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item index-able and searchable on the Internet). A user may choose a default privacy setting for all user data that is to be posted. Additionally, a user may specifically exclude certain entities from viewing a user datum or a particular type of user data.

In addition to user profile information, the social networking system may track or maintain other information on or outside the social networking system about the user. For example, a geo-social networking system is a social networking system hosts one or more location-based services that record the user's location. For example, users may access the geo-social networking system using a special-purpose client application hosted by a mobile device of the user. The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. For example, social network system may post information describing a user's check-in to the user's profile page, which may cause the information to be included in newsfeeds of other users of the social networking system. In other implementations, the social networking system may add the information to such news feeds without posting it to a user profile page. The user may also add, delete or update events that the user is associated with. For example, a user may update a social event associated with a time and date that the user is planning to attend, or make comments in his wall-posts about a past event he attended.

Additionally, social networking system may provide various communication channels for users to interact with each other. Thus, users of a social networking system may interact with each other by sending and receiving content items of various types of media through the communication channels. In particular embodiments, communication channels may include, but are not limited to, email, instant messaging (IM), text, voice or video chat, and wall posts. A user of the social networking system may also interact through various communication channels outside the social networking system with another person (a user or non-user of the social networking system). Examples of those communication channels are phone call though public switched telephone network (PSTN) or the Internet (e.g., VOIP or voice over internet protocol), text, voice or video chat, SMS (short message service) text messaging, instant messaging, and email. To keep track of communication channel information, a user of the social networking system may keep one or more address books. An address book may contain one or more contacts (e.g., a person or a business identify) and for each contact, communication channel information for the contact (e.g., a phone number, a user ID for an IM service, an email address, a user ID for a social networking system, home address, etc.). A user of the social networking system may keep the one or more address books inside or outside the social networking system. For example, the social networking system may maintain an address book for a user, and the user can access the address book though the social networking system's web site, or through a client application hosted by a client device 122. For example, a user may keep an address book in a client application hosted by the user's personal computer (e.g., Microsoft Outlook) or keep an address book in a native address book application supported by the user's mobile phone. For example, a user may keep an address book hosted over the Internet by a remote server (i.e., the address book is hosted "in the cloud") and access the address book via a web browser on a client device 122. The social networking system and the client device 122 may also include functionality that allows synchronization of address book contact information. For example, a user may keep an address book in a client application hosted by the user's personal computer (e.g., Microsoft Outlook) or keep an address book in a native address book application supported by the user's mobile phone. For example, a user may keep an address book hosted over the Internet by a remote server (i.e., the address book is hosted "in the cloud") and access the address book via a web browser on a client device 122. In other implementations, an address book database may be synchronized between the client device 122 and the social network system.

FIG. 1 illustrates an example social networking system. In particular embodiments, the social networking system may store user profile data and social graph information in user profile database 101. In particular embodiments, the social networking system may store user event data in event database 102. In particular embodiments, the social networking system may store user privacy policy data in privacy policy database 103. In particular embodiments, the social networking system may store geographic and location data in location database 104. In particular embodiments, databases 101, 102, 103, and 104 may be operably connected to the social networking system's front end 120. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, user profile database 101 may store communication channel information and an address book of a user. The address book, in one implementation, may be a superset or a subset of the users of the social networking system that a user has established a friend or contact relationship. A user of client device 122 may access this address book information using a special purpose or general purpose client application to view contact information. In particular embodiments, the address book may contain one or more contacts (e.g. a person or an business entity), and communication channel information for each contact (e.g., a phone number, a user ID for an IM service, an email address, a user ID for a social networking system, web addresss, home address, etc.). In particular embodiments, a user may access the address book, look up and connect to a contact through a communication channel. Ordinarily, when a person looks up an address book, the address book such as a native address book on a mobile phone often lists contacts by names alphabetically, but the contacts listed first may not be the most relevant. For example, when John looks up the address book in his mobile phone, his college friend "Andrew Adams" may always come up first even though John has not contacted Andrew Adams for 6 months. In addition, when a user selects another segment of an address book, such as contacts with last names starting with "D," the same situation may occur—that is, a less relevant contact may be listed first simply because of the alphabetical sorting utilized by most address book applications. Particular embodiments below describe methods in improving listing by an address book by ranking contacts in the address book based on social proximity.

Figure 2:
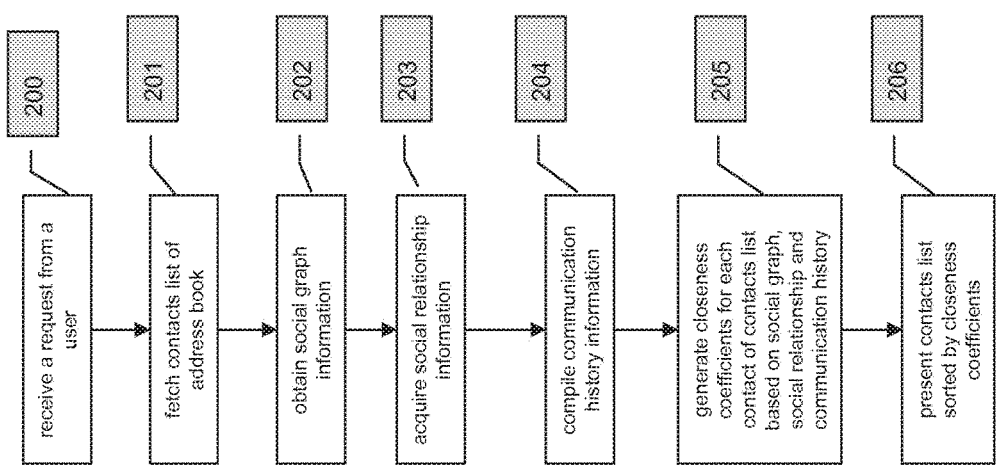
FIG. 2 illustrates an example method of ranking contacts in an address book based on social proximity.

FIG. 2 illustrates an example method of ranking contacts in an address book based on social proximity. FIG. 2 can be implemented by a contact-listing process hosted on one or more computing devices that can access the social networking system. In particular embodiments, the social networking system may store an address book of a user in user profile database 101. In particular embodiments, the address book may comprise one or more contacts. In particular embodiments, each contact of the one or more contacts in the address book may comprise a name and communication channel information. In particular embodiments, the name of a contact in the address book may be a name (including a first, middle, and/or last name) and/or a user ID corresponding to the contact in the social networking system (such as an open or universal user identifier) or a URL of a page associated with the contact. In one implementation, social graph information corresponding to contacts may also be stores, such as a relationship type identifier (e.g., married to, sister of, etc.) between the user and the contact, an affinity score between the user and the contact, the occupation of the contact, the education history of the contact, and the interests and activities of the contact. In one embodiment, the communication channel information in the address book may comprise communication channel data, wherein the communication channel data comprise communication channel type identifiers (e.g., email, work phone number, cell phone number, IM username, a group or chat room, home phone number, URL, etc.) and a value of the communication channel type identifier (e.g., joe@yahoo.com, 650.555.1212, www.facebook.com/joey, etc.). In particular embodiments, the contact-listing process may receive a request from a user to look up the user's address book (200). In particular embodiments, the contact-listing process may access the requesting user's address book stored in user profile database 101 and create a contacts list from the address book (201). In particular embodiments, the contacts list may comprise one or more names of one or more contacts of the requesting user's address book.

In particular embodiments, the contact-listing process may obtain social graph information for each contact in the contacts list (202). For example, the contact-listing process may access user profile database 101 and determine a degree of separation in the social graph from the requesting user for each contact in the contacts list. In particular embodiments, the contact-listing process may assign a coefficient for each degree of separation. For example, the contact-listing process can assign a degree of separation coefficient of 1.0 for one degree of separation (i.e., a contact is the requesting user's friend), a coefficient of 0.5 for two degrees of separation (i.e., a contact is the requesting user's friend's friend), a coefficient of 0.33 for three degrees of separation, etc. Other degree of separation coefficient values can be assigned for various degrees of separation. For example, a coefficient of 0.5 can be assigned to contacts that are one degree separated from the requesting user, while a coefficient of 0.33 can be assigned to contacts that are two degrees separated. In particular embodiments, the contact-listing process may assign a default degree of separation coefficient for a contact who is not part of the social network. For example, the contact-listing process can assign a degree of separation coefficient of 0.2 for a contact who is not part of the social networking system. Still further, these coefficients can be adjusted or modified based on other attributes, such as an affinity score between the requesting user and a contact. In one implementation, an affinity score can be based the communication frequency between users and include on one or more of the following attributes: 1) the number of days the users have communicated with each other over a given period of time, 2) the number of comments made to wall posts of either user, 3) the number of times each user has viewed the user profile of the other user, 4) the number of pokes between users, 5) the number of messages between the users, 6) the number of wall posts between the users, 7) the number of comments to wall posts shared between the users, 8) the number of likes the users have in common, 9) the number of photographs in which both users have been tagged, and 9) the number of photos and/or albums of one user the other user has viewed. A system for measuring user affinity is described more generally in U.S. patent application Ser. No. 11/503,093, filed on Aug. 11, 2006, which is hereby incorporated by reference in its entirety and for all purposes.

The contact-listing process may also consider additional relationship attributes either to adjust an initial degree of separation coefficient score that is based on degrees of separation or to compute an additional affiliation or relationship coefficient score. For example, the contact-listing process may consider declared relationships between users in the social networking system (e.g., "married to", "sibling of", "in a relationship with", etc.). For example, the contact-listing process may consider embedded social relationships in communications between a contact and the requesting user, such as text strings reflecting social proximity (e.g., "Mom", "Dad" in emails or SMS text messages). In other implementations, the contact listing process may also consider whether the contact is an actual person or an entity (such as an enterprise or organization). In particular embodiments, the contact-listing process may acquire declared social relationship information and embedded social relationships for each contact in the contacts list to compute an affiliation coefficient score for each contact (203). In particular embodiments, the contact-listing process may rank contacts in the contacts list by each contact's affiliation with the requesting user, or how close in social relationship between each contact of the contacts list and the requesting user. For example, the contact-listing process can assign an affiliation coefficient of 1.0 if a contact in the contacts list is the user's parent, wife/husband, or sibling, or an affiliation coefficient of 0.7 if the contact in the contacts list is a friend of friend of the user, and the contact and the user went to the same college at the same time, or a default affiliation coefficient of 0.5 if a contact in the contacts list has no declared or embedded social relationship with the user, or the contact has no known spatial and/or temporal closeness to the user. A system for measuring user affinity is described more generally in U.S. patent application Ser. No. 11/503,093, filed on Aug. 11, 2006, which is hereby incorporated by reference in its entirety and for all purposes.

In particular embodiments, the contact-listing process may access user profile database 101 to compile communication history information between the requesting user and each contact in the contacts list in order to generate a communication history coefficient score (204). In particular embodiments, a user's communication history may comprise frequency information for each communication channel in the inbound and/or outbound directions with each contact in the user's address book, as well as other individuals within and/or outside the social network. For example, a user's communication history can store information such as the number of emails, instant messages, texts, etc sent/received between one or more contacts/social proximity groups (e.g., family, friends, second-degree friends, etc.), the number of text messages sent/received between one or more contacts/social proximity groups, the number of phone calls sent/received between one or more contacts/social proximity groups, and the like. In some implementations, the client device 122, such as a mobile device may be configured to periodically upload log data that can be processed by the social networking system to generate this information. In some implementations, the communication history data may be raw or log data that is processed to yield these statistics. In other implementations, a data mining process may periodically analyze the log data and maintain the above-identified counts over various slide time intervals. In some implementations, a local process executing on the client device 122 can process this information and generate statistical data for use by the social networking system. In particular embodiments, a connection between a user and another person may cause updates to the user's communication history accordingly. For example, a user can look up a contact in the user's address book by accessing a client application hosted on the user's mobile phone, call the contact by a phone number listed in the address book, and the client application updates the user's communication history for the contact accordingly (e.g., incrementing outbound call frequency for the contact/social proximity group by 1). For example, a user may receive an SMS text message from a contact on a client application hosted by the user's mobile phone, and the client application can update the user's communication history for the contact accordingly (e.g., incrementing inbound SMS frequency for the contact by 1).

In particular embodiments, the contact-listing process may generate a closeness coefficient for each contact in the contacts list based on the social graph information (e.g., a degree of separation coefficient), the social relationship information (e.g., an affiliation coefficient), and the communication history information (e.g., a communication history coefficient) (205). In particular embodiments, the contact-listing process may present the contacts list as sorted by closeness coefficients (206). In particular embodiments, the contact-listing process may store the closeness coefficients in user profile database 101.

Figure 3:
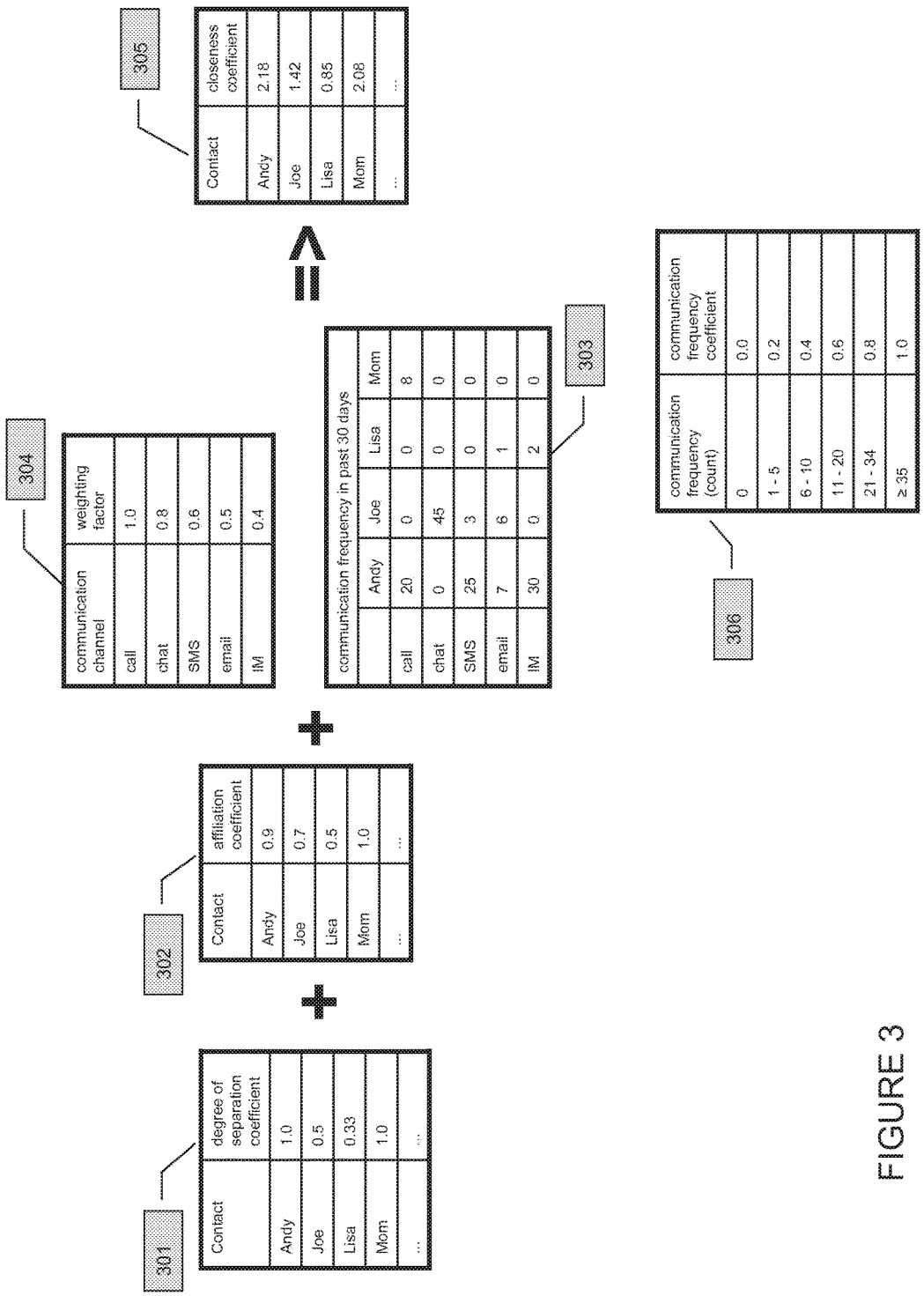
FIG. 3 illustrates an example of generating closeness coefficients.

FIG. 3 illustrates an example process flow for generating closeness coefficients. In particular embodiments, the contact-listing process may assemble social graph information arranged in a table of degree of separation coefficients (301), social relationship information arranged in a table of affiliation coefficients (302), and communication history information arranged in a table of communication frequency for each contact (303). In the example of 303, communication frequency of a particular communication channel can be expressed as count values for different contacts and communications channels. For example, 20 of the phone calls in the past 30 days made or received by the user are with a contact named Andy, another 8 of the phone calls in the past 30 days occurred between the subject user and a contact identified as Mom. As FIG. 3 illustrates, other count values may be maintained for other communications channels. In particular embodiments, the contact-listing process may assign different weightings for different communication channels when generating closeness coefficients. For example, the contact-listing process can assign a weighting of 1.0 for phone call, 0.8 for chat, 0.6 for SMS, 0.4 for email and 0.2 for IM. In one implementation, the count values may map to a frequency coefficient value and a weighting may be applied. For example, various count value ranges can map to different communication frequency coefficients (306). For example a count value of 0 may map to a 0 coefficient value, while a count value of 1 to 5 may map to a coefficient value of 0.2. A coefficient value of 1 may be assigned to a count value of 35 or more. The aggregate communications history coefficient may be a weighted average of all component values.

In particular embodiments, the contact-listing process may generate a closeness coefficient for a contact by calculating a sum of the degree of separation coefficient, the affiliation coefficient, and a weighted average of the communication history coefficient (305). In the example of contact "Andy" in FIG. 3, the contact-listing process can calculate a closeness coefficient as follows:

$$\begin{aligned} \text{closeness coefficient} &= \text{degree of separation} + \text{affiliation coefficient} + \\ &\quad \text{weighted average of communication frequency} \\ &\quad \text{coefficient} \\ &= 1.0 + 0.9 + \text{AVERAGE}(0.6*1.0 + 0.0*0.8 + \\ &\quad 0.8*0.6 + 0.4*0.5 + 0.8*0.4) \\ &= 2.17 \end{aligned}$$

Table 305 show example closeness coefficients or social proximity scores as calculated by the method above. In other implementations, closeness coefficients may also include a location-based component that considers the physical proximity between a user and the contacts. In some implementations, this can be based on a fixed location, such as mailing or home addresses. In other implementations, this can be based on current locations. Current locations can be based on user check-ins to places in a geo-social networking system. U.S. application Ser. No. which is incorporated by reference herein for all purposes discloses an example geo-social networking system. In one implementation, a weighted component score based on a function that varies with distance can be included in the computations discussed above. In this manner, a contact that is currently in the same location (or a nearby location) may be upranked and presented more readily to the user.

Figure 4:
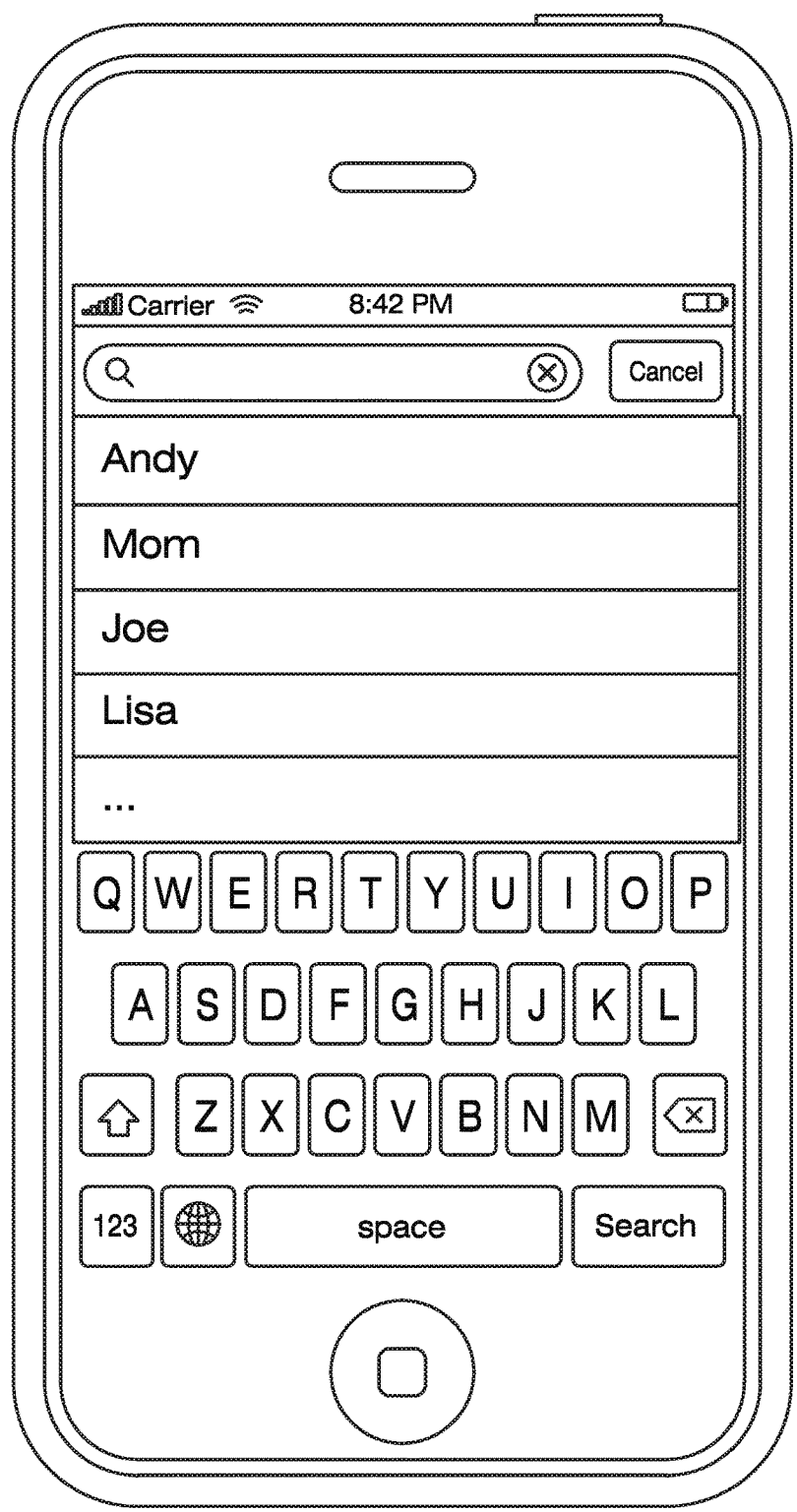
FIG. 4 illustrates an example of presenting to a requesting user a contacts list as sorted by closeness coefficients.

FIG. 4 illustrates an example of presenting to a requesting user a contacts list sorted by closeness coefficients. As in the example of FIG. 3, the contact-listing process can order the contacts list starting from "Andy", who has the highest closeness coefficients (i.e., closest to the requesting user), followed by "Mom", "Joe", and "Lisa", and the social networking system can present the contacts list in the order of "Andy", "Mom", "Joe" and "Lisa" to the requesting user. Still further, the closeness coefficients can be used to rank subsets of users. For example, an address book application can use the closeness coefficients to rank a filtered set of contacts. For example, a user may begin to type a name, and a type-ahead process may scan the contacts list for matching names that meet the text string in the text field and rank the matching contacts based on closeness coefficient. A user may also select a sort key or divider by alphabet to look at the "A" section of the address book for contacts having last names. In other implementations, an address book application may identify those contacts having a closeness coefficient above a threshold value and list them in a special interface page or section, or list them ahead of an alphabetically sorted list of contacts.

As a user of the social networking system can keep one or more address books outside the social networking system, in additional to the address book stored in user profile database 101, it may be more efficient (e.g., to reduce network traffic between the social networking system and a remote device) to store a local copy of closeness coefficients with each address book outside the social networking system. In particular embodiments, the contact-listing process may store a local copy of closeness coefficients in a user's client device 122. In one embodiment, the contact-listing process may store a local copy of a table of closeness coefficients, a table of communication channel weighting factors, a table of degree of separation coefficients for one or more contacts, and table of communication history for one or more contacts, in a storage device of a user's client device 122 (e.g., a microSD flash memory card in a mobile phone). In particular embodiments, the contact-listing process may store a local copy of closeness coefficients in a server hosting a user's address book. In one embodiment, the contact-listing process may store a local copy of a table of closeness coefficients, a table of communication channel weighting factors, a table of degree of separation coefficients for one or more contacts, and table of communication history for one or more contacts, in a storage device (e.g., a hard disk drive) of a server hosting a user's address book, or in a storage device linked to a server hosting a user's address book. In particular embodiments, a connection between a user and another person may cause the contact-listing process to update a local copy of closeness coefficients. For example, a user may receive an SMS text message from a contact on a client application hosted by the user's mobile phone, and the client application can cause the contact-listing process to calculate and store the closeness coefficient for the contact locally. For example, a server hosting a user's address book can facilitate a chat session between the user and a contact, then cause the contact-listing process to calculate and store the closeness coefficient for the contact locally. In particular embodiments, the contact-listing process may present contacts in a user's address book as sorted by locally stored closeness coefficients.

In particular embodiments, the contact-listing process may synchronize one or more local copies of closeness coefficients with the closeness coefficients stored in user profile database 101. For example, the contact-listing process can poll a local copy of closeness coefficients in a user's mobile phone every Monday at 3 AM, determine changes in the local copy and changes in the closeness coefficients stored in user profile database 101, and update the local copy and the closeness coefficients stored in user profile database 101 if needed.

Figure 5:
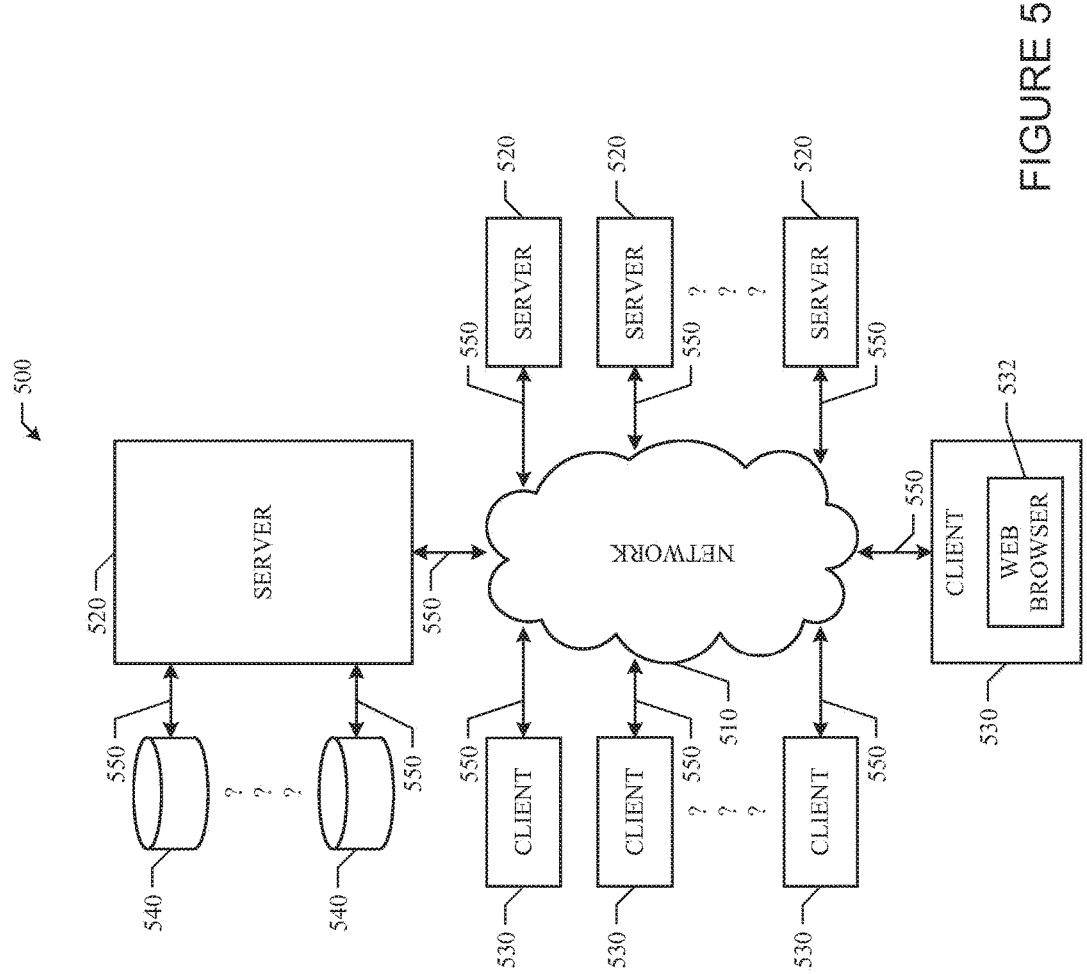
FIG. 5 illustrates an example network environment.

While the foregoing embodiments may be implemented in a variety of network configurations, the following illustrates an example network environment for didactic, and not limiting, purposes. FIG. 5 illustrates an example network environment 500. Network environment 500 includes a network 510 coupling one or more servers 520 and one or more clients 530 to each other. Network environment 500 also includes one or more data storage 540 linked to one or more servers 520. Particular embodiments may be implemented in network environment 500. For example, social networking system frontend 120 may be written in software programs hosted by one or more servers 520. For example, event database 102 may be stored in one or more storage 540. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510.

One or more links 550 couple a server 520 or a client 530 to network 510. In particular embodiments, one or more links 550 each includes one or more wired, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, one or more data storages 540 may be communicatively linked to one or more servers 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functions implemented or supported by client 530. For example and without limitation, a client 530 may be a desktop computer system, a notebook computer system, a netbook computer system, a handheld electronic device, or a mobile telephone. The present disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 6:
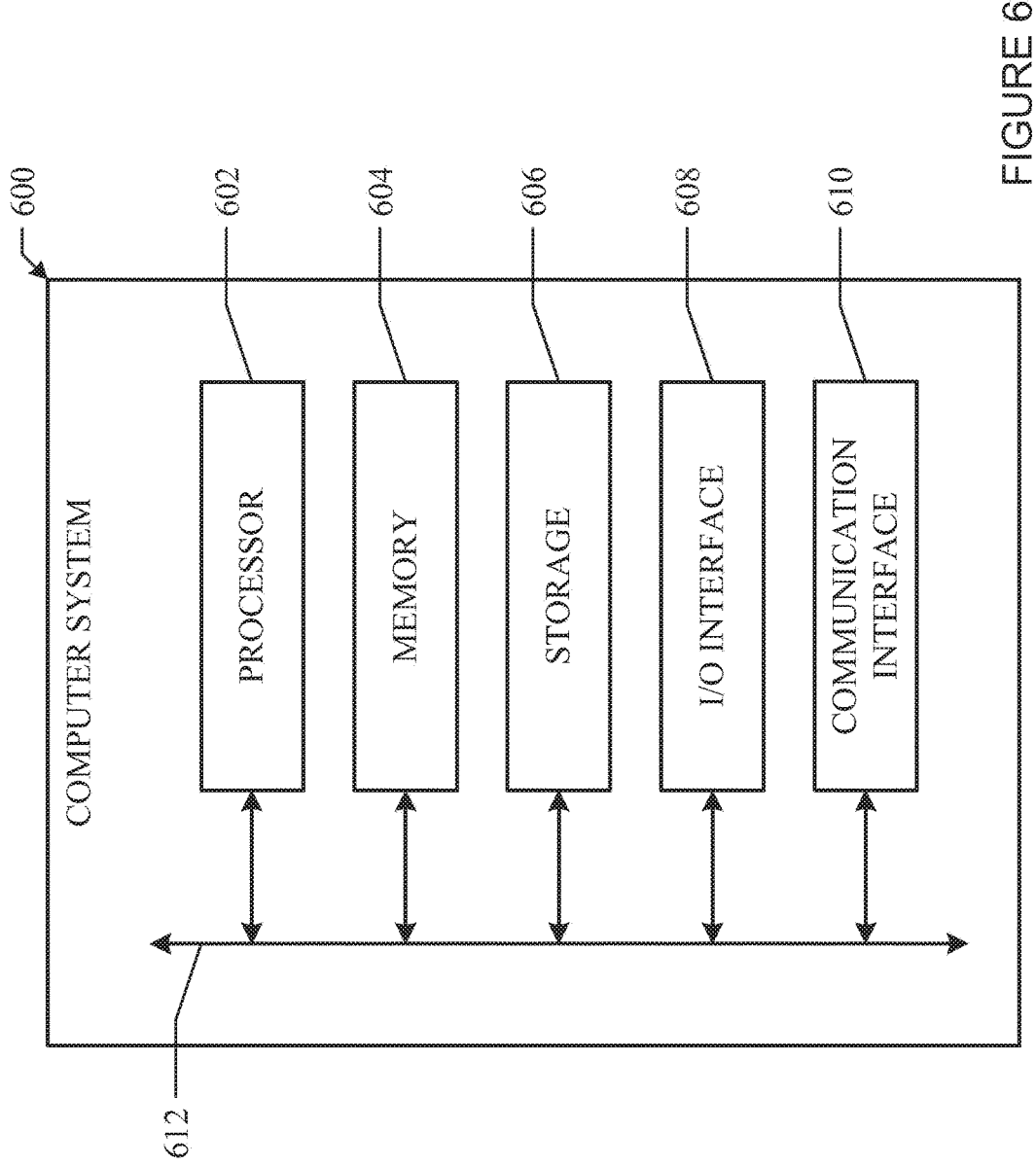
FIG. 6 illustrates an example computer system.

FIG. 6 illustrates an example computer system 600, which may be used with some embodiments of the present invention. This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 602, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 602, or storage 606; decode and execute them; and then write one or more results to an internal register, an internal cache, memory 602, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation look-aside buffers (TLBs). Instructions in the instruction caches may be copies of instructions in memory 602 or storage 606, and the instruction caches may speed up retrieval of those instructions by processor 602. Data in the data caches may be copies of data in memory 602 or storage 606 for instructions executing at processor 602 to operate on; the results of previous instructions executed at processor 602 for access by subsequent instructions executing at processor 602 or for writing to memory 602 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 602 includes main memory for storing instructions for processor 602 to execute or data for processor 602 to operate on. As an example and not by way of limitation, computer system 600 may load instructions from storage 606 or another source (such as, for example, another computer system 600) to memory 602. Processor 602 may then load the instructions from memory 602 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 602. In particular embodiments, processor 602 executes only instructions in one or more internal registers or internal caches or in memory 602 (as opposed to storage 606 or elsewhere) and operates only on data in one or more internal registers or internal caches or in memory 602 (as opposed to storage 606 or elsewhere). One or more memory buses (which may each include an address bus and a data bus) may couple processor 602 to memory 602. Bus 612 may include one or more memory buses, as described below. In particular embodiments, one or more memory management units (MMUs) reside between processor 602 and memory 602 and facilitate accesses to memory 602 requested by processor 602. In particular embodiments, memory 602 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 602 may include one or more memories 602, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 602, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising, by one or more computing devices:
    receiving communication history information indicative of communications, made using an external application over a plurality of communication channels, with one or more contacts, wherein receiving the communication history information comprises:
        accessing a data store of communication history; and
        determining a usage frequency for each of one or more communication channels for the contact;
    determining a weighted frequency coefficient for each of the one or more contacts based on the communication history information, wherein the weighted frequency coefficient is weighted based on the particular communication channel from which the communication was sent;
    identifying a corresponding social-proximity score for each of the one or more contacts, wherein each social-proximity score is determined based on social-graph information for the one or more contacts, and wherein the social-graph information comprises (1) a degree-of-separation coefficient for each contact with respect to a user and (2) an affiliation coefficient for each contact with respect to the user; and
    updating each social-proximity score for the one or more contacts based on the weighted frequency coefficient.

2. The method of claim 1, wherein the updated social-proximity scores are updated based on a new communication between a user and at least one of the one or more contacts, and wherein the external application is used to send or receive the new communication is executing on a remote client device.

3. The method of claim 1, further comprising:
    accessing communication history information for each contact in a contacts list for a user of the external application, the communication history information for a contact indicating a frequency of communication between the user and the contact.

4. The method of claim 1, wherein the social-proximity score for each contact is further determined based on one or more user-declared relationship types between the first user and other contacts of the contacts list.

5. The method of claim 1, further comprising determining a ranked list of the contacts based on the social-proximity scores.

6. The method of claim 1, wherein the social-proximity scores are further determined based on social-graph information for the one or more contacts, wherein the social-graph information comprises a degree-of-separation coefficient for each contact with respect to a user.

7. The method of claim 6, wherein the social-graph information further comprises an affiliation coefficient for each contact with respect to the user.

8. The method of claim 1, further comprising:
    accessing a weighting factor for each of the communication channels, wherein the social-proximity score for each contact is based on a summation of the degree-of-separation coefficient, the affiliation coefficient, and a weighted average of the usage frequency of the communication channels, and wherein the weighted average is calculated with a weighting factor for each of the communication channels.

9. The method of claim 1, wherein a highest weighting is applied to the weighted frequency coefficient for a first communication where the particular communication channel is a phone call and a lower weighting is applied for a second communication where the particular communication channel is an email.

10. A system comprising:
one or more processors; and
a memory coupled to the processors comprising instructions executable by the processors, the processors being operable when executing the instructions to:
receive communication history information indicative of communications, made using an external application over a plurality of communication channels, with one or more contacts, wherein receiving the communication history information comprises:
accessing a data store of communication history; and
determining a usage frequency for each of one or more communication channels for the contact;
determine a weighted frequency coefficient for each of the one or more contacts based on the communication history information, wherein the weighted frequency coefficient is weighted based on the particular communication channel from which the communication was sent;
identify a corresponding social-proximity score for each of the one or more contacts, wherein each social-proximity score is determined based on social-graph information for the one or more contacts, and wherein the social-graph information comprises (1) a degree-of-separation coefficient for each contact with respect to a user and (2) an affiliation coefficient for each contact with respect to the user; and
update each social-proximity score for the one or more contacts based on the weighted frequency coefficient.

11. The system of claim 10, wherein the updated social-proximity scores are updated based on a new communication between a user and at least one of the one or more contacts, and wherein the external application is used to send or receive the new communication is executing on a remote client device.

12. The system of claim 10, wherein the processors are further operable to:
access communication history information for each contact in a contacts list for a user of the external application, the communication history information for a contact indicating a frequency of communication between the user and the contact.

13. The system of claim 10, wherein the social-proximity score for each contact is further determined based on one or more user-declared relationship types between the first user and other contacts of the contacts list.

14. The system of claim 10, further comprising determining a ranked list of the contacts based on the social-proximity scores.

15. The system of claim 10, wherein the social-proximity scores are further determined based on social-graph information for the one or more contacts, wherein the social-graph information comprises a degree-of-separation coefficient for each contact with respect to a user.

16. The system of claim 15, wherein the social-graph information further comprises an affiliation coefficient for each contact with respect to the user.

17. The system of claim 10, wherein a highest weighting is applied to the weighted frequency coefficient for a first communication where the particular communication channel is a phone call and a lower weighting is applied for a second communication where the particular communication channel is an email.

18. One or more computer-readable non-transitory storage media embodying software that is operable when executed to:
receive communication history information indicative of communications, made using an external application over a plurality of communication channels, with one or more contacts, wherein receiving the communication history information comprises:
accessing a data store of communication history; and
determining a usage frequency for each of one or more communication channels for the contact;
determine a weighted frequency coefficient for each of the one or more contacts based on the communication history information, wherein the weighted frequency coefficient is weighted based on the particular communication channel from which the communication was sent;
identify a corresponding social-proximity score for each of the one or more contacts, wherein each social-proximity score is determined based on social-graph information for the one or more contacts, and wherein the social-graph information comprises (1) a degree-of-separation coefficient for each contact with respect to a user and (2) an affiliation coefficient for each contact with respect to the user; and
update each social-proximity score for the one or more contacts based on the weighted frequency coefficient.

19. The computer-readable non-transitory storage media of claim 18, wherein a highest weighting is applied to the weighted frequency coefficient for a first communication where the particular communication channel is a phone call and a lower weighting is applied for a second communication where the particular communication channel is an email.

* * * * *